3,154,572
PREPARATION OF MONO-UNSATURATED ALIPHATIC NITRILES

Le Roi E. Hutchings and William L. Fierce, both of Crystal Lake, Ill., assignors to The Pure Oil Company, Chicago, Ill., a corporation of Ohio
No Drawing. Filed Oct. 16, 1961, Ser. No. 145,465
6 Claims. (Cl. 260—465.3)

This invention relates to the preparation of nitriles by reaction of cyanogen with an olefin. More particularly, this invention relates to the high-temperature preparation of mono-unsaturated olefinic nitriles, such as acrylonitrile and derivatives thereof, by reaction of cyanogen with an olefin in admixture with hydrogen.

Unsaturated nitriles, particularly acrylonitrile, have found extensive use in various industries, notably as intermediates in the preparation of various organic chemicals. Acrylonitrile is frequently utilized as a reactant in the preparation of acrylic polymers and resins. Acrylonitrile is produced commercially by two processes. One process is based upon the reaction of hydrogen cyanide with acetylene in the presence of a catalyst, while the other process involves the reaction of hydrogen cyanide with ethylene oxide to produce ethylene cyanohydrin which is then dehydrated to acrylonitrile. Another process for the preparation of acrylonitrile is disclosed in U.S. Patent 2,445,693, in which a gaseous mixture of non-aromatic hydrocarbons (containing at least 2 carbon atoms) and hydrogen cyanide is pyrolyzed in the absence of a catalyst at 750°–1000° C. In Fierce et al., Patent 2,803,642, there is described a process which is an improvement over the aforementioned commercial processes in that it involves a single reaction and does not require the use of a catalyst. In the Fierce et al. patent, the process described involves the high-temperature reaction between cyanogen and ethylene (or other olefins) at temperatures above about 700° C., at atmospheric pressure and without a catalyst. The process of this invention represents an improvement over the process of the Fierce et al. patent.

It is therefore one object of this invention to provide a new and improved process for the preparation of acrylonitrile and homologs thereof.

Another object of this invention is to provide an improved process for the preparation of acrylonitrile and its homologs from cyanogen and an olefin.

A further object of this invention is to provide an improved process for the preparation of acrylonitrile in purified form and in an economical manner.

A feature of this invention is the provision of an improved process for the preparation of acrylonitrile and its homologs by the high-temperature reaction of cyanogen with an olefin, preferably a lower alkene, in admixture with hydrogen at an elevated temperature.

Another feature of this invention is the provision of an improved process for the preparation of acrylonitrile and homologs thereof by the high-temperature reaction of cyanogen with a mixture of hydrogen and ethylene or propylene at a temperature of about 700°–850° C., in the absence of catalysts or promoters.

Other objects and features of this invention will become apparent from time to time throughout the specification and claims as hereinafter related.

This invention is based upon our discovery that the yield of acrylonitrile and its homologs in the process of Fierce et al., Patent 2,803,642, can be substantially and unexpectedly improved by the addition of a small amount of hydrogen (0.1–0.6 mol $H_2$/mol $(CN)_2$) in the cyanogen-olefin feed. In the Fierce et al. patent an olefin-containing gas is contacted with a cyanogen-containing gas at a temperature sufficiently high to bring about the desired reaction. Cyanogen is mixed with the olefin, or mixture of olefins, in gaseous form in any suitable manner, such as, for example, merely introducing each gas to the inlet of a reaction zone and allowing the molecular activity of each to cause sufficient intermixing and diffusion of the components within the reaction zone. Other suitable means includes the circulation of the gases by a fan or blower or other mixing device. The olefin or olefins and cyanogen can be mixed in any desired ratio or volume. Preferably, ethylene is used in a molar ratio of 1–10:1 of the cyanogen. Thus, for example, a suitable molar ratio of ethylene to cyanogen is 5:1, although other ratios may be used. Other olefins can be used in the same or different ratios to react with cyanogen. After admixing, the gaseous mixture is reacted at atmospheric pressure and in the reaction zone at a temperature of at least about 700° C., preferably from about 750°–1000° C. No catalysts are present in the reaction zone, which may be any conventional type of conversion apparatus containing any standard type of heat transfer. Thus, for example, a pebble-heater may be utilized to obtain the reaction temperature, or the reaction temperature may be attained by steam coils, heating coils, exterior firing of the reaction vessel, etc. The rate of flow of reactants through the reaction zone is not critical and the gaseous hourly space velocity may range from as low as 10–50 to as high as 2,000–10,000. On reaction, there is a small but substantial conversion of cyanogen and the olefin, and a moderate yield of acrylonitrile, or its homologs, is obtained. If desired, the acrylonitrile may be recyled with the unreacted materials or may be separated from the unreacted gas mixture by solvent extraction, fractional distillation after condensation, or other standard means of separating heterogeneous boiling mixtures. The process can be run on a batch basis or on a semi-continuous or continuous basis. Where continuous operation is desired, fresh gas comprising cyanogen and an olefin is constantly introduced into the reaction chamber while the product gases are constantly removed for separation of products and by-products and recycling of unreacted constituents. In carrying out this process, the same procedure is utilized as in the Fierce et al. patent except that a small amountt of hydrogen is incorporated in the cyanogen-olefin feed mixture. The addition of hydrogen to the feed mixture results in a marked improvement in the yield per pass of acrylonitrile or its homologs. The proportion of hydrogen in the reaction mixture is somewhat critical, although even very small amounts of hydrogen are effective. The mol ratio of cyanogen to olefin to hydrogen is preferably about 1:1 to 10:0.1 to 0.6, respectively. The process is limited to the temperature range from about 700° to 850° C. since higher temperatures promote the reaction of hydrogen with cyanogen to yield hydrogen cyanide.

The following non-limiting examples are illustrative of the scope of this invention.

EXAMPLE I

The process of our invention is further illustrated by reference to the following Table I, which gives conditions of reaction and results obtained in runs using cyanogen and ethylene as reactants, with and without added hydrogen. The runs were carried out using an empty, vertically-mounted, electrically heated Vycor (high-silica glass) reactor tube having 92 cc. volume in the heated zone. Cyanogen was fed at a rate of 32.1–33.3 cc./min., in admixture with helium at a rate of 50 cc./min. The helium-cyanogen mixture was mixed with ethylene at a flow rate of 344–346 cc./min., and the gas mixture heated in the reactor tube. Gas samples of the charge and product gases were taken for mass spectrometric analysis. Both runs were the same in appearance. After each run there was a yellow coloration in the reactor tube below the furnace. There was a faint liquid film at the lower end of the yellow zone. The product bomb was coated with a faint white haze, as was the apparatus below the reactor tube. No attempt was made to recover or identify this solid or liquid material. The results shown in Table I are based solely on the mass spectrometric analysis of the charge and product gases.

*Table I*

| Run No. | 144 | 145 |
|---|---|---|
| Temperature Range (° C.) | 723–730 | 725–730 |
| Gaseous hourly space velocity of total charge gas | 286 | 292 |
| Molar Proportions of $C_2H_4$: $(CN)_2$: $H_2$ | 10.3:1.0:0.0 | 10.8:1.0:0.31 |
| Duration of run (minutes) | 30 | 30 |
| Percent Conversion of $C_2H_4$ | 6.1 | 14.1 |
| Percent Conversion of $(CN)_2$ | 6.0 | 15.2 |
| Acrylonitrile yields:[1] | | |
| Percent Yield per Pass | 1.3 | 3.1 |
| Percent Selectivity | 22.5 | 20.4 |

[1] The above selectivity calculations are based on cyanogen, using the following equation for the reaction:

$$2C_2H_4 + (CN)_2 \rightarrow 2C_2H_3CN + H_2$$

No HCN was detected in the product gases in these runs.

EXAMPLE II

In another series of experiments, the process was studied at higher temperatures and using different proportions of hydrogen in the reaction mixture. In these runs the same apparatus was used as in Example I. In Table II there are set forth the conditions of several runs and the results obtained.

*Table II*

| Run No. | 5 | 6 | 28 | 29 | 30 |
|---|---|---|---|---|---|
| Temperature Range (° C.) | 774–6 | 773–6 | 798–805 | 796–806 | 798–812 |
| Gaseous Hourly Space Velocity of charge gas | 250 | 224 | 307 | 308 | 343 |
| Mol ratio: $C_2H_4$: $(CN)_2$: $H_2$ | 15.4:1.0:0 | 12.3:1.0:0.58 | 3.5:1.0:0 | 3.8:1.0:0.30 | 3.8:1.0:2.1 |
| Duration of run (min.) | 35 | 30 | 30 | 30 | 30 |
| Percent Conversion of $C_2H_4$ | 22.3 | 9.1 | 4.2 | 41.1 | 91.5 |
| Percent Conversion of $(CN)_2$ | 26.0 | 19.4 | 37.3 | 54.0 | 78.3 |
| Acrylonitrile yields:* | | | | | |
| Percent Yield per pass | 5.5 | 7.3 | 14.6 | 21.1 | 12.7 |
| Percent Selectivity | 21.0 | 37.5 | 39.2 | 39.2 | 16.2 |

*Yield and selectivity are based on cyanogen charged and cyanogen consumed, respectively.

The improvement in yield and selectivity for formation of acrylonitrile by the reaction of cyanogen and ethylene occurs throughout the temperature range from about 700° to 850° C. While the proportion of hydrogen used in the above-noted runs was quite small, the addition of hydrogen to the ethylene-cyanogen reaction is effective over a moderate range of proportions (0.1 to 0.6 mol per mol of $(CN)_2$) as previously indicated. At higher reaction temperatures and higher proportions of hydrogen in the reaction mixture there is a substantial yield of HCN, which is to be avoided, if possible.

When propylene is substituted for ethylene for reaction with cyanogen, a similar effect is observed. The addition of a small proportion of hydrogen (0.1 to 0.6 mol per mol of $(CN)_2$) to the olefin-cyanogen reaction mixture results in an improvement in yield of acrylonitrile and its $C_4$ homolog (a mono-unsaturated nitrile containing 4 carbon atoms). We have found, therefore, that this process is generally applicable to the preparation of mono-unsaturated olefinic nitriles by reaction of cyanogen and lower alkenes ($C_2$–$C_8$ alkenes) at temperatures of about 700°–850° C. (preferably about 800° C.) in the absence of catalysts and promoters. The addition of hydrogen to the reaction mixture in each case results in an improvement in the yield and selectivity for formation of unsaturated nitriles.

While we have described our process fully and completely with special emphasis on several preferred embodiments thereof we wish it to be understood that within the scope of the appended claims this invention may be practiced otherwise than as specifically described herein.

The embodiments of the invention in which an exclusive property or privilege is claimed are defined as follows:

1. A process for the preparation of mono-unsaturated olefinic nitriles containing 3–4 carbon atoms which consists of heating a mixture of hydrogen, cyanogen, and a lower alkene selected from the group consisting of ethylene and propylene in a mol ratio of 0.1–0.6/1.0/1–10, respectively, to a temperature of about 700°–850° C.

2. A process in accordance with claim 1 in which the reaction takes place in the absence of catalysts and promoters and at atmospheric pressure.

3. A process in accordance with claim 2 in which the cyanogen is substantially pure cyanogen, the alkene is ethylene, and the product nitrile is acrylonitrile.

4. A process in accordance with claim 2 in which the cyanogen is substantially pure cyanogen, the alkene is propylene, and the products include acrylonitrile and its homolog containing 4 carbon atoms.

5. A process for the preparation of acrylonitrile which consists of heating cyanogen, hydrogen, and ethylene in a mol ratio of about 1:0.3–0.4:3–4, respectively, at gaseous hourly space velocity of 50 to 2000 to a temperature of 700° to 850° C., in the absence of catalysts and promoters, and recovering the product acrylonitrile from the reaction effluent.

6. A process for the preparation of acrylonitrile and its homolog containing 4 carbon atoms consists of heating cyanogen, hydrogen, and propylene in a mol ratio of 1:0.3–0.4:3–4, respectively, at gaseous hourly space velocity of 50 to 2000 to a temperature of 700° to 850° C., in the absence of catalysts and promoters, and recovering the product nitriles from the reaction effluent.

References Cited in the file of this patent

UNITED STATES PATENTS 2,803,642    Fierce et al. _____ Aug. 20, 1957